(12) United States Patent
Wu et al.

(10) Patent No.: US 8,607,636 B2
(45) Date of Patent: Dec. 17, 2013

(54) TRIAXIAL VIBRATION COMPOSITE TESTING APPARATUS

(75) Inventors: Yuanzhen Wu, Suzhou (CN); Qionghua Zhong, Suzhou (CN)

(73) Assignee: Suzhou Sushi Testing Instrument Co., Ltd., Suzhou (CN)

( * ) Notice: Subject to any disclaimer, the term of this patent is extended or adjusted under 35 U.S.C. 154(b) by 370 days.

(21) Appl. No.: 13/091,735

(22) Filed: Apr. 21, 2011

(65) Prior Publication Data

US 2011/0239771 A1 Oct. 6, 2011

Related U.S. Application Data

(63) Continuation of application No. PCT/CN2009/000372, filed on Apr. 3, 2009.

(30) Foreign Application Priority Data

Feb. 13, 2009 (CN) .......................... 2009 1 0024507

(51) Int. Cl.
*B06B 3/00* (2006.01)

(52) U.S. Cl.
USPC .......................................................... 73/663

(58) Field of Classification Search
USPC .......................................... 73/663, 662, 665
See application file for complete search history.

(56) References Cited

U.S. PATENT DOCUMENTS

| | | | |
|---|---|---|---|
| 5,291,787 A * | 3/1994 | Laforest et al. | 73/663 |
| 5,549,005 A | 8/1996 | Aoki et al. | |
| 6,377,900 B1 * | 4/2002 | Ueno et al. | 702/109 |
| 6,860,152 B2 * | 3/2005 | Lund et al. | 73/663 |
| 8,308,271 B2 * | 11/2012 | Seki et al. | 347/37 |

FOREIGN PATENT DOCUMENTS

| | | | |
|---|---|---|---|
| CN | 101241036 A | | 8/2008 |
| JP | 2001108570 | * | 4/2001 |
| JP | 2008102036 | * | 5/2008 |
| KR | 2003058412 | * | 7/2003 |

OTHER PUBLICATIONS

International Search Report issued in International Patent Application No. PCT/CN2009/000372 dated Nov. 26, 2009 (with translation).

Office Action issued in Chinese Patent Application No. 200910024507.X dated Mar. 1, 2010 (with translation).

* cited by examiner

*Primary Examiner* — J M Saint Surin
(74) *Attorney, Agent, or Firm* — Oliff & Berridge, PLC (57) ABSTRACT

A triaxial vibration composite testing apparatus including a working tabletop, wherein the second axial vibration transmission mechanism in the horizontal X axial direction and the third axial vibration transmission mechanism in the horizontal Y axial direction are both cross linear guide pairs; the first axial vibration transmission mechanism in the perpendicular Z axial direction includes an upper and a lower clamps and a central panel, the upper and the lower clamps being horizontally opposite to each other up and down, the central panel being positioned between the upper and the lower clamps, the upper and the lower clamps oppositely clamping the central panel; a gap fit between the lower surface of the upper clamp and the upper surface of the central panel forms an upper fit plane, and a gap fit between the upper surface of the lower clamp and the lower surface of the central panel a lower fit plane; and the high pressure oil is pumped into the upper fit plane gap and the lower fit plane gap to form a hydrostatic oil film, thus constituting a hydrostatic plane bearing mechanism.

4 Claims, 5 Drawing Sheets

TRIAXIAL VIBRATION COMPOSITE TESTING APPARATUS

This is a Continuation of International Application No. PCT/CN2009/000372 filed Apr. 3, 2009, which claims the benefit of Chinese Patent Application No. 200910024507.X filed Feb. 13, 2009. The disclosure of the prior applications is hereby incorporated by reference herein in its entirety.

FIELD OF THE INVENTION

The present invention relates to a mechanical condition testing device, and particularly to an X-Y-Z triaxial vibration composite testing apparatus. This triaxial vibration composite testing apparatus can be used for simulating both the separate vibration condition and the composite vibration condition simultaneously in the X, Y and Z axial directions.

BACKGROUND OF THE INVENTION

The natural vibration a product experiences under the actual working condition is the composite vibration in the triaxial directions of X, Y and Z. In order to actually show the vibration resistance of the product and simulate the natural vibration condition, a triaxial vibration composite testing apparatus is finally designed after many years of attempt.

Figure 1:
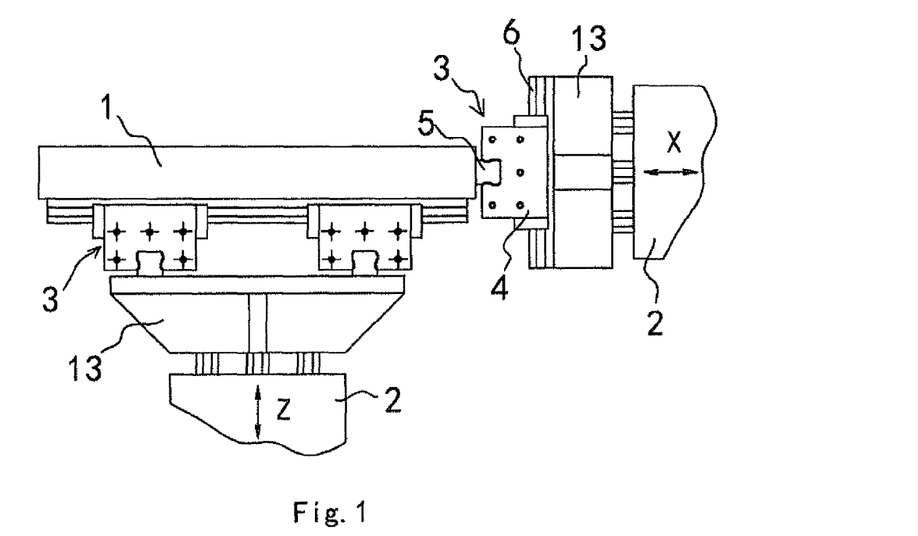
FIG. 1 is a structural front schematic view of the prior cross-guide triaxial vibration composite testing apparatus.
Figure 2:
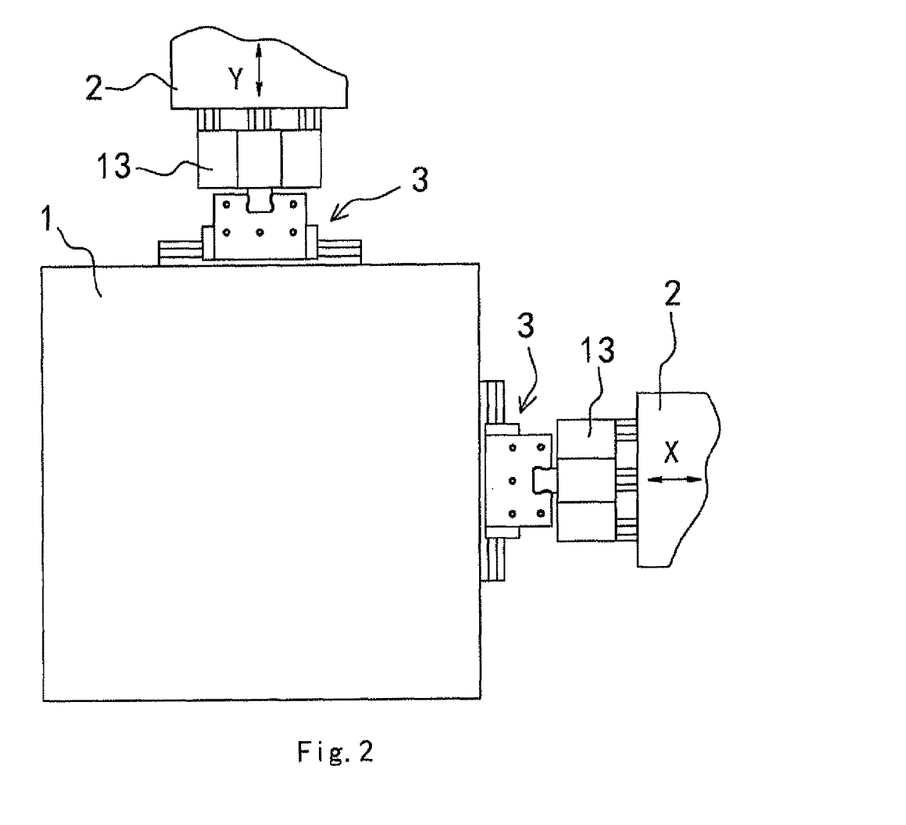
FIG. 2 is a top schematic view of FIG. 1.

Many kinds of triaxial vibration composite testing apparatuses have been disclosed so far at home and abroad, which generally have the following structure: There is a working tabletop 1 for receiving a test piece; a vibration generator 2 is positioned in the triaxial directions of X, Y and Z, respectively, with the working tabletop 1 as the datum; and the working tabletop 1 is connected with each of the vibration generators 2 through an axial vibration transmission mechanism. The axial vibration transmission mechanism is used to constitute a rigid connection in this axial direction and transmit the exciting force of the vibration generator 2 to the working tabletop 1, while to decouple in the other biaxial directions. Among the prior various triaxial vibration composite apparatuses are the two representative ones as below:

1. Cross-linear-guide triaxial vibration composite testing apparatus. See an application for a patent for an invention titled "Connection Mechanism of Three-Way Exciting Platform of Vibration Table" disclosed in the Chinese Patent Publication No. 101241036A on Aug. 13, 2008. The structure is as shown in FIGS. 1 and 2. The force transmission mechanisms in its triaxial directions of X, Y and Z (i.e. the axial vibration transmission mechanisms) are all a cross linear guide pair 3, which is specifically composed of a slide block 4 as well as a transverse guide 5 and a longitudinal guide 6 in sliding connection with the upper and the lower end planes of the slide block, respectively. This triaxial vibration composite testing apparatus is simple in structure because the axial vibration transmission mechanism adopts the cross linear guide pair 3, and low in manufacturing cost because the cross linear guide pair 3 can be bought. However, this apparatus has the following shortcomings:

1) The motion mass is very different in various axial directions.

2) There are so many connection joints on the force transmission path from the vibration generator 2 to the working tabletop 1 that the vibration frequency response characteristic is affected, and especially its vibration response characteristic in the perpendicular Z axial direction is very poor, which makes it applicable to the low frequency vibration test.

Figure 3:
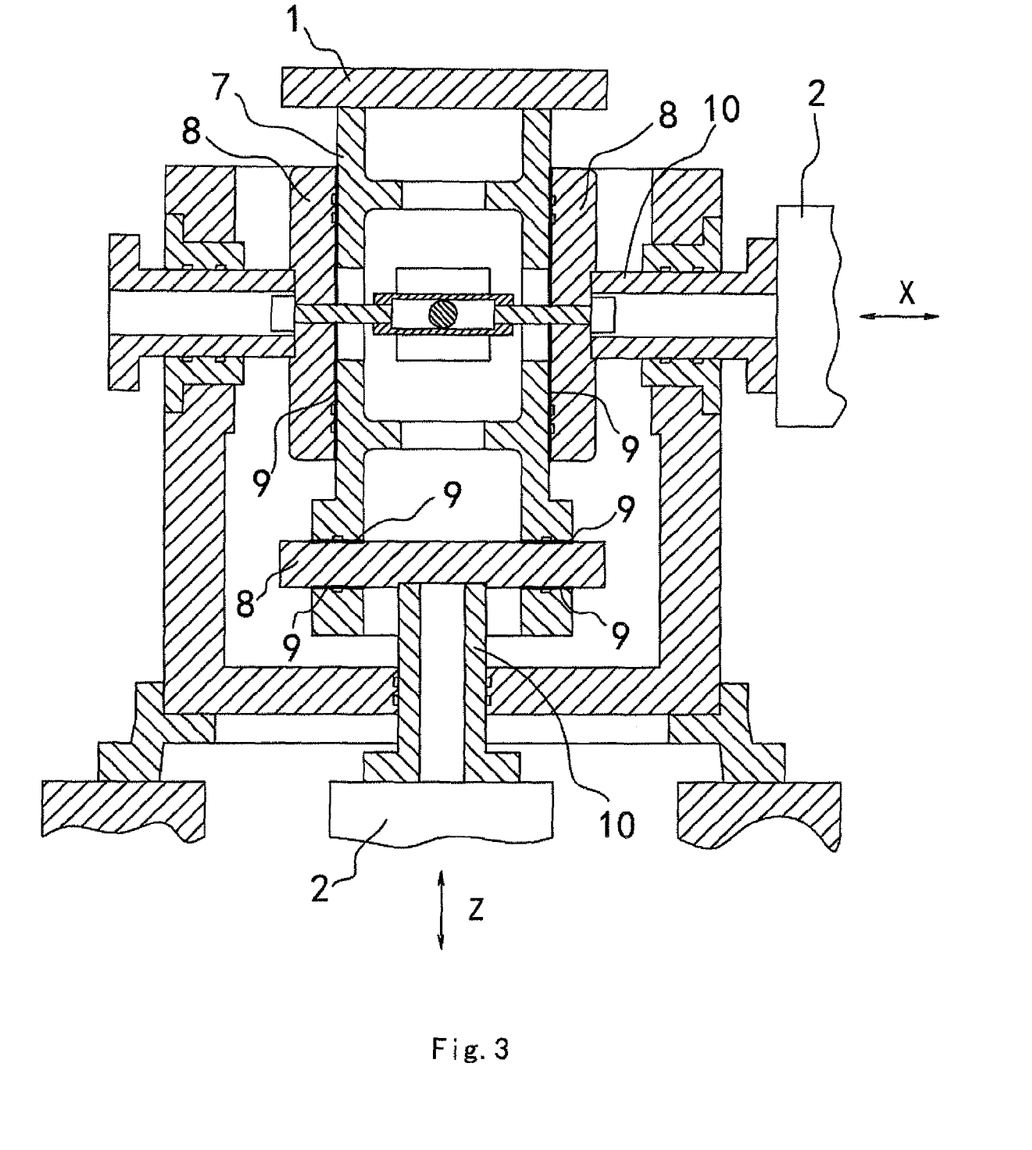
FIG. 3 is a structural schematic view of the prior hydrostatic triaxial vibration composite testing apparatus.

2. Hydrostatic triaxial vibration composite testing apparatus. See U.S. Pat. No. 5,549,005. The structure is as shown in FIG. 3. The working tabletop 1 is in fixed connection below with a middle cube 7, at the left, right, front and back of which as well as below which is positioned a pressure application plate 8. Each of the pressure application plates 8 fits the middle cube 7 with a plane gap, each of which is filled with the high pressure oil to form a hydrostatic oil film 9, thus constituting a triaxial hydrostatic plane bearing structure. Each of the pressure application plates 8 is in fixed connection outside with a connection shaft 10, through which the vibration generators 2 in various axial directions are connected. In short, this triaxial vibration composite testing apparatus uses the hydrostatic plane bearing as the axial vibration transmission mechanism to connect the working tabletop 1 to the uniaxial vibration generator 2. This triaxial vibration composite testing apparatus is light in weight due to fewer motion parts in each of the axial directions, wide in the vibration frequency range with the upper working frequency limit up to over 1,000,000 Hz, and good in the frequency response characteristic. However, it still has the following shortcomings:

1) Manufacture. Because of the hydrostatic bearing structure in all the triaxial directions, the structure is more complicated, and each of the fit planes is high in requirement and hard to be processed, which increases the manufacturing cost.

2) Vibration test performance. The middle cube 7 of a certain height needs to be positioned below the working tabletop 1 to facilitate arranging the pressure application plate 8, which then increases the distance from the working tabletop 1 to the vibration generator 2 in the perpendicular axial direction (that is, the working tabletop 1 is lifted up), thus affecting the entire rigidity to some extent; the middle cube 7 and several pressure application plates 8 need to be positioned below the working tabletop 1, which increases the mass of the motion part; the rigidity is poor and the mass of the motion part big, which directly limit the further increase in the working frequency; moreover, lifting the working tabletop 1 also causes the antioverturning moment capacity to decrease.

CONTENTS OF THE INVENTION

The present invention provides a triaxial vibration composite testing apparatus, which aims at making an improvement on the basis of the prior triaxial-hydrostatic-bearing triaxial vibration composite apparatus, not only lowering the processing and manufacturing difficulty and the cost, but also further increasing the upper working frequency limit to broaden the working frequency range as well as the antioverturning moment capacity.

In order to attain the above-mentioned purpose, a technical solution of the present invention is as below: A triaxial vibration composite testing apparatus is provided including a working tabletop, which is connected in a perpendicular Z axial direction with a Z axial vibration generator through a first axial vibration transmission mechanism, in a horizontal X axial direction with an X axial vibration generator through a second axial vibration transmission mechanism, and in a horizontal Y axial direction with a Y axial vibration generator through a third axial vibration transmission mechanism. It is characterized in that the second axial vibration transmission mechanism and the third axial vibration transmission mechanism are both a cross linear guide pair, which includes a slide block, a transverse guide and a longitudinal guide, the transverse guide and the longitudinal guide being crossingly positioned on both sides of the slide block and in sliding connection with the same; as for the transverse guide and the longitudinal guide, one of them is in fixed connection with the X or Y axial vibration generator, while the other with the working tabletop;

the first axial vibration transmission mechanism includes an upper and a lower clamps and a central panel, the upper and the lower clamps being horizontally opposite to each other up and down, the central panel being positioned between the upper and the lower clamps, the upper and the lower clamps oppositely clamping the central panel; a gap fit between the upper surface of the central panel and the lower surface of the upper clamp forms an upper fit plane, and a gap fit between the lower surface of the central panel and the upper surface of the lower clamp a lower fit plane; an oil filling passage is positioned at the upper and the lower clamps or the central panel for filling oil into the upper fit plane gap and the lower fit plane gap, and the pumped high pressure oil forms a hydrostatic oil film in the upper fit plane gap and the lower fit plane gap, thus constituting a hydrostatic plane bearing mechanism; this hydrostatic plane bearing mechanism is connected with the Z axial vibration generator and the working tabletop as below:

the central panel is in fixed connection with the working tabletop, and the upper or lower clamp with the Z axial vibration generator via a connection member;

alternatively, the upper or lower clamp is in fixed connection with the working tabletop, or the upper surface of the upper clamp is used as the working tabletop; and the central panel is in fixed connection with the Z axial vibration generator via the connection member.

The relevant contents of the above two technical solutions are explained as below:

1. In the above solutions, the vibration generators in the Z, X and Y axial directions can be an electric vibration table, a mechanical vibration table, a hydraulic vibration table or a mechanical vibration mechanism, wherein the mechanical vibration mechanism refers to a mechanism that can produce the mechanical vibration.

2. In the above solutions, the upper and the lower clamps are penetrated with a tension screw, via which the upper and the lower clamps are connected to constitute a gap-adjustable clamping structure. During operation, the spacing between the upper and the lower clamps, i.e. the gap between the fit planes, can be adjusted by rotating the tension screw, so as to adjust rigidity of the hydrostatic oil film.

3. In the above solutions, the apparatus further includes a Z axial guide support, which is fixed relative to the table body of the Z axial vibration generator and provided in the Z axial direction with a guide hole, through which passes the central part of the connection member; the internal surface of the guide hole and the external surface of the connection member constitute fit faces via gap fit, and the high pressure oil is pumped between these fit faces to form a hydrostatic oil film, thus constituting a hydrostatic bearing guide structure.

4. In the above solutions, a circular dustproof film is connected between the circumference of the working tabletop and that of the Z axial guide support, enclosing circumferentially the section from the test-piece working table to the Z axial guide support to prevent such miscellanies as dust from entering the hydrostatic bearing.

The designing concept of the present invention is as below: The applicant has been performing in-depth test and analysis for many years on the prior various triaxial vibration composite testing apparatuses (especially the prior triaxial-hydrostatic-bearing vibration composite testing apparatus). Through many times of testing demonstration, it is found that the perpendicular Z axial direction is much poorer than the horizontal X axial direction and the horizontal Y axial direction while vibration in such performance indexes as the frequency response characteristic and the upper working frequency limit, that is, the vibration working frequency in the perpendicular Z axial direction decides the working frequency of the entire apparatus. Therefore, when making an improvement on the triaxial-hydrostatic-bearing vibration composite testing apparatus, the applicant keeps the hydrostatic plane bearing in the perpendicular Z axial direction as the axial vibration transmission mechanism, but changes the axial vibration transmission mechanism in the X axial and the Y axial directions into the cross linear guide pair, thus increasing the triaxial composite working frequency range up to over 2000 Hz. The specific analysis is as below: Because the axial vibration transmission mechanism in the X axial and the Y axial directions is changed into the cross linear guide pair, the working tabletop does not need to be provided on the side with a pressure application plate, which can shorten as far as possible the distance between the working tabletop and the Z axial vibration generator in the perpendicular Z axial direction (i.e. lowering the working tabletop), thus increasing the entire rigidity and reducing the mass of motion parts. Increase in rigidity and decrease in mass of the motion part make the upper working frequency limit further increased. Moreover, the cross linear guide pair can be bought, which simplifies the structure, reduces the manufacturing difficulty, and lowers the manufacturing cost.

The present invention relates to the following three applications:

1. Uniaxial vibration test. For example, when performing the Z axial vibration test, only the Z axial vibration generator needs to be started to produce the vibration in the Z axial direction; because the working tabletop is connected with the vibration generator through the first axial vibration transmission mechanism, with the axial vibration transmission direction being exactly the Z axial direction, whereas it is free sliding fit in the X and the Y axial directions, the vibration produced by the Z axial vibration generator is transmitted to the working tabletop through the first axial vibration transmission mechanism, thus realizing the Z uniaxial vibration test. When producing vibration in the X and the Y axial directions, only the vibration generator in the corresponding direction needs to be started, with the working process similar to what mentioned above.

2. Composite vibration test simultaneously in the biaxial directions. Although the vibration condition in the product application happens essentially simultaneously in the triaxial directions, when the vibration in one axial direction is so small compared to that in the other two axial directions that it can be neglected, or when the vibration in one axial direction less affects the vibration test result, we can perform the vibration test on the test piece simultaneously in the biaxial directions, which can reproduce the actual working condition more accurately compared to that in the separate two axial directions. During operation, only the vibration generators in the corresponding biaxial directions need to be started. The vibrations they produce will be transmitted to the working tabletop through the axial vibration transmission mechanism and superposed, thus realizing the biaxial composite vibration test.

3. Composite vibration test simultaneously in the triaxial directions. The triaxial composite vibration is the closest to the natural condition. During operation, the three vibration generators are started, and the vibration produced by the three vibration generators are simultaneously superposed and applied onto the working tabletop through the axial vibration transmission mechanism, thus realizing the triaxial composite vibration test.

Compared with the prior art, the present invention has the following advantages:

1. With the special structure of the present invention, since the axial vibration transmission mechanism in the X axial and the Y axial directions is changed into the cross linear guide pair, the working tabletop does not need to be provided on the side with a pressure application plate, which can shorten as far as possible the distance between the working tabletop and the Z axial vibration generator in the perpendicular Z axial direction (i.e. lowering the working tabletop), thus increasing the entire rigidity.

2. With the special structure of the present invention, since the axial vibration transmission mechanism in the X axial and the Y axial directions is changed into the cross linear guide pair, the working tabletop does not need to be provided on the side with a pressure application plate, which reduces the number of the middle cubes as well as the mass of the motion part in the triaxial directions.

3. The present invention is increased in rigidity and decreased in mass of the motion part, which further increases the upper working frequency limit.

4. With the special structure of the present invention, since the axial vibration transmission mechanism in the X axial and the Y axial directions is changed into the cross linear guide pair, the working tabletop is lowered, thus improving the antioverturning moment capacity.

5. The cross linear guide pair of the present invention can be bought, which simplifies the mechanical structure, lowers the manufacturing difficulty, and greatly reduces the manufacturing cost.

In the above drawings; 1. Working tabletop; 2. vibration generator; 3. cross linear guide pair; 4. slide block; 5. transverse guide; 6. longitudinal guide; 7. middle cube; 8. pressure application plate; 9. hydrostatic oil film; 10. connection shaft; 12. guide; 13. additional tabletop; 20. working tabletop; 21. Z axial vibration generator; 22. X axial vibration generator; 23. Y axial vibration generator; 24. first axial vibration transmission mechanism; 25. second axial vibration transmission mechanism; 26. third axial vibration transmission mechanism; 27. upper clamp; 28. lower clamp; 29. central panel; 30. oil filling passage; 31. slide block; 32. transverse guide; 33. longitudinal guide; 34. tension screw; 35. Z axial guide support; 36. guide hole; 37. connection member; 38. hydrostatic oil film; 39. circular dustproof film; 40. linear guide connection member; 41. connection body; 42. avoidance slot; 43. avoidance slot; 44. additional tabletop; and 45, hydrostatic oil film.

DETAILED DESCRIPTION OF THE EMBODIMENTS

The present invention will further be described below with reference to drawings and embodiments.

Figure 4:
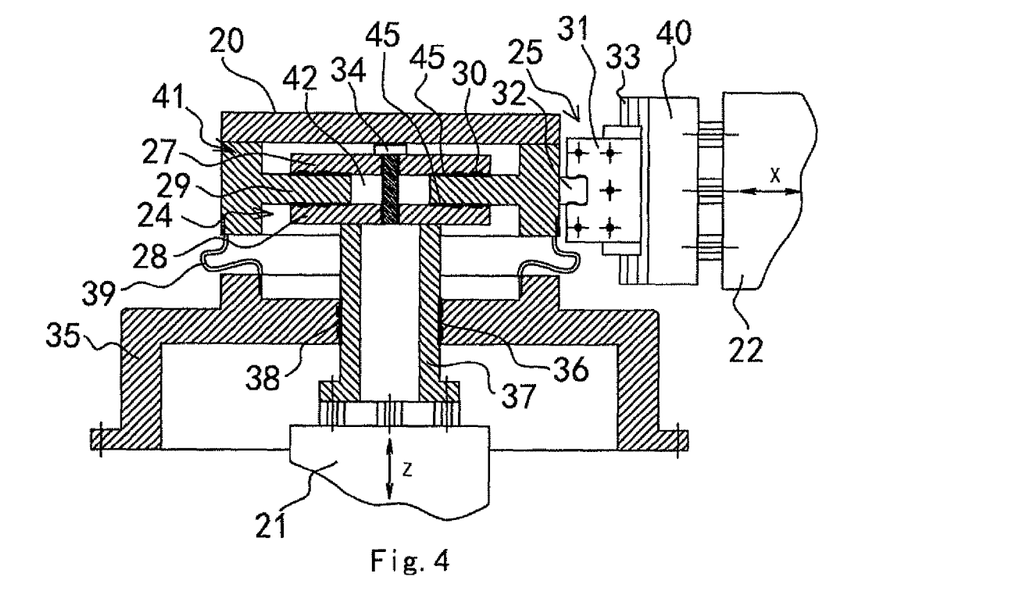
FIG. 4 is a structural front schematic view of Embodiment 1 of the present invention.
Figure 5:
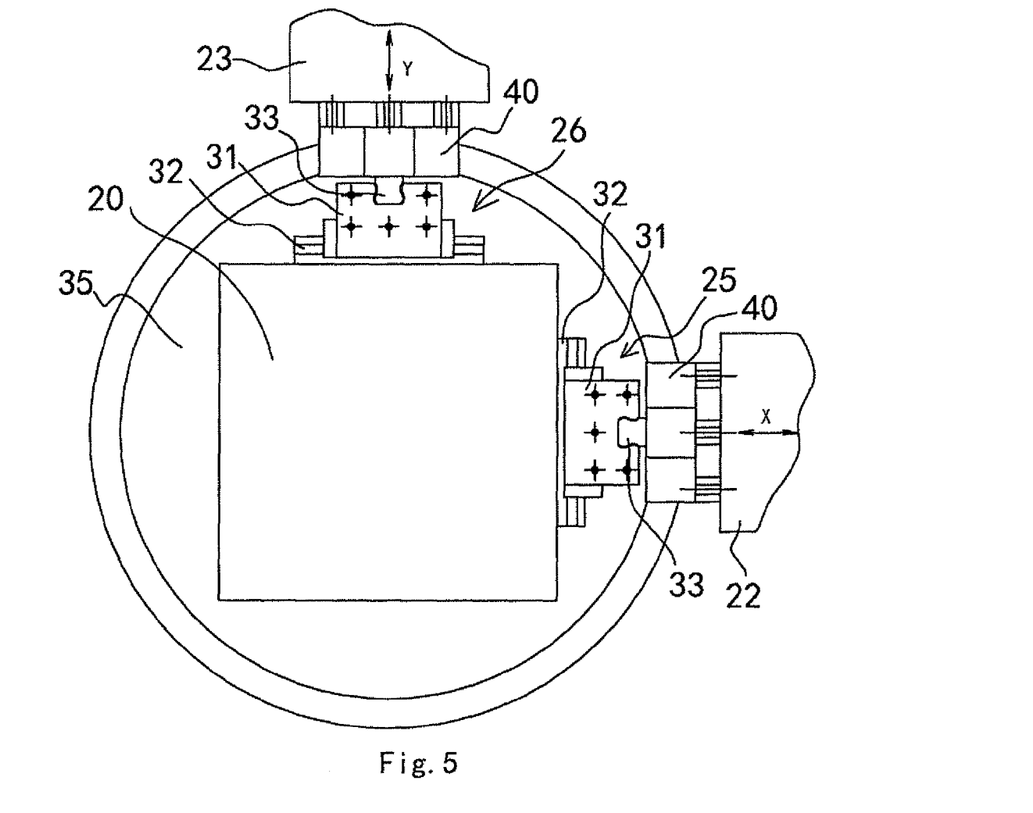
FIG. 5 is a top schematic view of FIG. 4.

Embodiment 1: As shown in FIGS. 4 to 5, a triaxial vibration composite testing apparatus is provided including a working tabletop 20, which is connected in a perpendicular Z axial direction with a Z axial vibration generator 21 through a first axial vibration transmission mechanism 24, in a horizontal X axial direction with an X axial vibration generator 22 through a second axial vibration transmission mechanism 25, and in a horizontal Y axial direction with a Y axial vibration generator 23 through a third axial vibration transmission mechanism 26.

The first axial vibration transmission mechanism 24 includes an upper clamp 27 and a lower clamp 28 and a central panel 29. The working tabletop 20 is provided below with a connection body 41. The connection body 41, having an H-shaped cross section, is in fixed connection at its top circumferential wall with the bottom of the working tabletop 20, with its central transverse plate being the central panel 29. The upper clamp 27 and the lower clamp 28 are oppositely positioned horizontally above and below the central transverse plate (i.e. the central panel 29) of the connection body 41, respectively. The central panel 29 is provided at the center with an avoidance slot 42, through which the upper clamp 27 and the lower clamp 28 are connected by a tension screw 34, with the upper clamp 27 and the lower clamp 28 oppositely clamping the central panel 29. The avoidance slot 42 is required to be bigger than the moving range of this apparatus in the X and the Y axial directions, and the tension screw 34 will not touch the side wall of the slot 42 during operation. A gap fit between the lower surface of the upper clamp 27 and the upper surface of the central panel 29 forms an upper fit plane, and a gap fit between the upper surface of the lower clamp 28 and the lower surface of the central panel 29 a lower fit plane. An oil filling passage 30 is positioned at the upper clamp 27 and the lower clamp 28 for filling oil into the upper fit plane gap and the lower fit plane gap, and the pumped high pressure oil forms a hydrostatic oil film 45 in the upper fit plane gap and the lower fit plane gap, thus constituting a hydrostatic plane bearing mechanism. The spacing between the upper clamp 27 and the lower clamp 28, i.e. the spacing between the fit planes, can be adjusted via the tension screw 34, thereby the rigidity of the hydrostatic oil film 45 being adjusted.

This hydrostatic plane bearing mechanism is connected with the Z axial vibration generator 21 and the working tabletop 20 as below: The central panel 29 is in fixed connection with the working tabletop 20 via the connection body 41, and the lower clamp 28 with the Z axial vibration generator 21 via the connection member 37 (specifically a hollow shaft).

The second axial vibration transmission mechanism 25 and the third axial vibration transmission mechanism 26 are both cross linear guide pairs, each of which includes one slide block 31, one transverse guide 32 and one longitudinal guide 33, the transverse guide 32 and the longitudinal guide 33 being crossingly positioned and space with each other, the slide block 31 locate between the transverse guide 32 and the longitudinal guide 33 and slidingly connect to the transverse guide 32 and the longitudinal guide 33 at the same time. As for the transverse guide 32 and the longitudinal guide 33, the longitudinal guide 33 is in fixed connection with the X axial vibration generator 22 or the Y axial vibration generator 23 through the linear guide connection member 40, and the transverse guide 32 is in fixed connection specifically with the circumferential side wall of the connection body 41 and finally connected to the working tabletop 20.

The above-mentioned apparatus further includes a Z axial guide support 35, which is in fixed connection at the bottom with the Z axial vibration table body and provided in the Z axial direction with a guide hole 36, through which passes the central part of the connection member 37. The internal surface of the guide hole 36 and the external surface of the connection member (specifically a hollow shaft) 37 constitute the fit faces via the gap fit, and the high pressure oil is pumped between these fit faces to form a hydrostatic oil film 38, thus constituting a hydrostatic bearing guide structure. A circular dustproof film 39 is connected between the bottom circumference of the connection member 41 and the top circumference of the Z axial guide support 35, so as to enclose the circumferential gap between them and prevent the foreign dust from entering the hydrostatic plane bearing during operation.

This embodiment can be applied in the following three ways: 1. Vibration test in the separate X, Y or Z axial direction; 2. composite vibration test simultaneously in the biaxial directions; and 3. composite vibration test simultaneously in the triaxial directions. When performing the composite vibration test simultaneously in the triaxial directions, make the triaxial composite vibration reproduce the natural vibration waveform under the actual working condition by man-made designing and coordinating the waveforms of various vibration generators, so as to make the vibration closest to the effect of the natural actual vibration.

Figure 6:
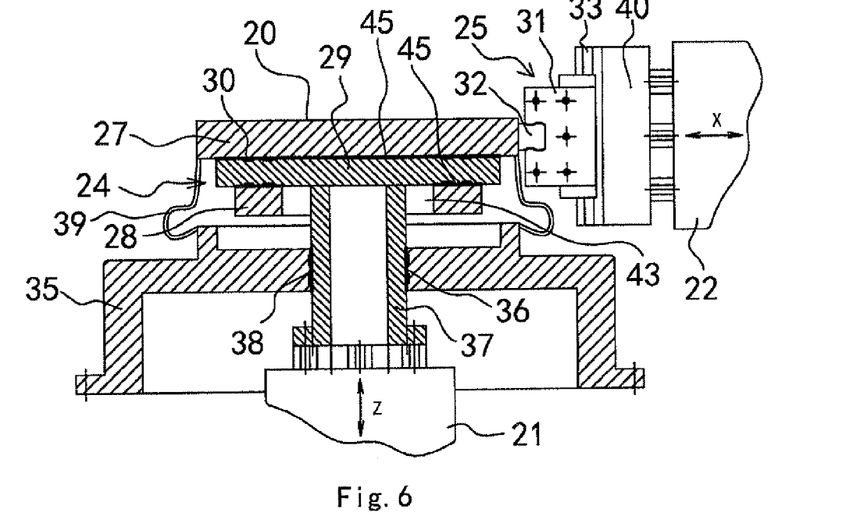
FIG. 6 is a structural front schematic view of Embodiment 2 of the present invention.
Figure 7:
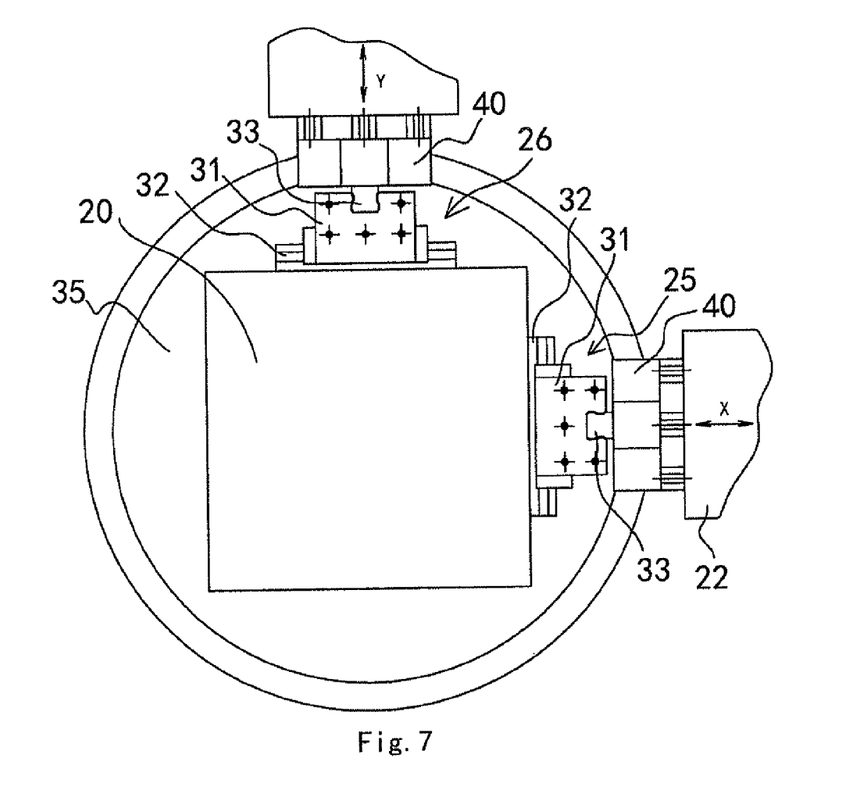
FIG. 7 is a top schematic view of FIG. 6.

Embodiment 2: As shown in FIGS. 6 to 7, a triaxial vibration composite testing apparatus is provided, including a working tabletop 20. It is different from Embodiment 1 in that it has no connection body 41, and directly uses the upper surface of the upper clamp 27 as the working tabletop 20; the central panel 29 is in fixed connection at the bottom with the connection member 37, and in connection with the vibration body of the Z axial vibration generator 21 through the connection member 37; the avoidance connection member 37 on the lower clamp 28 is provided with an avoidance slot 43; and the upper clamp 27 is directly in fixed connection at the side with the transverse guide 32 in the second axial vibration transmission mechanism 25 and the third axial vibration transmission mechanism 26. A circular dustproof film 39 is connected between the bottom circumference of the upper clamp 27 and the top circumference of the Z axial guide support 35, so as to enclose the circumference between them and prevent dust from entering.

Figure 8:
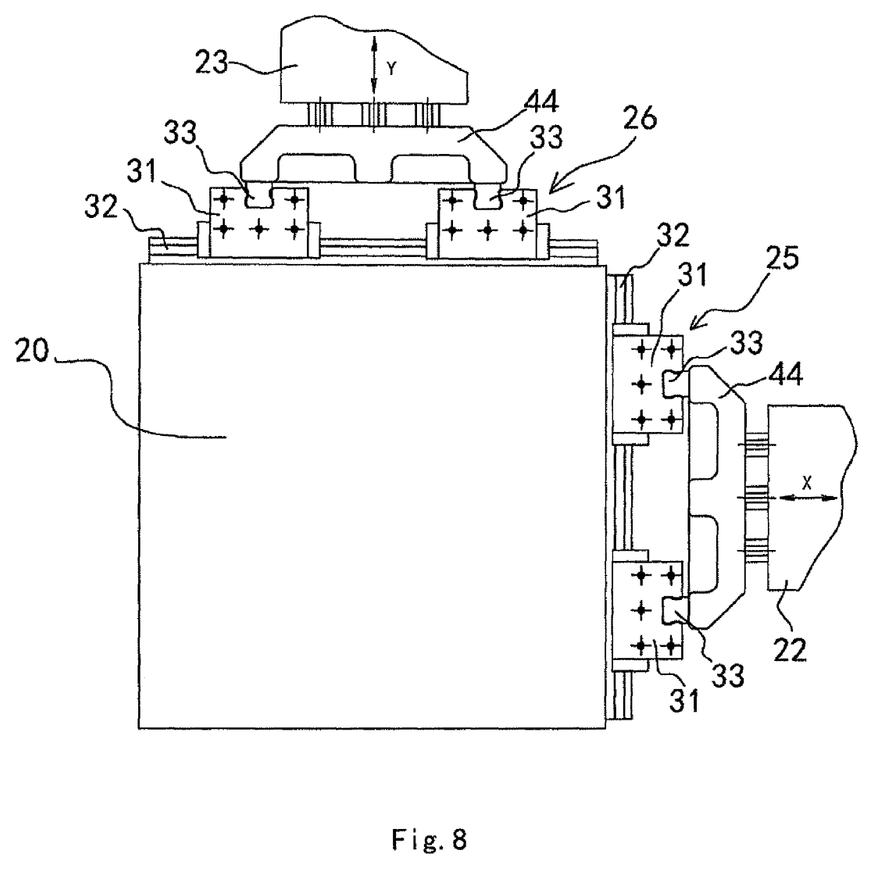
FIG. 8 is a structural top schematic view of Embodiment 3 of the present invention.

Embodiment 3: As shown in FIG. 8, a triaxial vibration composite testing apparatus is provided, including a working tabletop 20, three vibration generators and a triaxial vibration transmission mechanism. It is different from Embodiment 1 in that the second axial vibration transmission mechanism 25 and the third axial vibration transmission mechanism 26 are both cross linear guide pairs, each of which includes one transverse guide 32, two longitudinal guides 33, and two slide blocks 31; the two longitudinal guides 33 are positioned in parallel, and the transverse guide 32 and the two longitudinal guides 33 crossingly, with a slide block 31 at each of the two crosspoints; certainly, the transverse guide 32 and the longitudinal guide 33 are still in sliding connection with the slide block 31. The two parallel longitudinal guides 33 in the second axial vibration transmission mechanism 25/the third axial vibration transmission mechanism 26 are in fixed connection through an additional tabletop 44 with the X axial vibration generator 22/the Y axial vibration generator 23.

Other embodiments are the same with Embodiment 1, and will not be described here any more.

The working tabletop 20 in the above-mentioned Embodiment 3 is bigger in area, and therefore in this case a cross linear guide pair is used that has two longitudinal guides 33. In the actual application, the specific number of the transverse guide 32, the longitudinal guide 33 and the slide block 31 in the cross linear guide pair are unlimited, and can be adjusted according to area and thickness of the working tabletop 20.

The above embodiments are used only for explaining the technical concept and characteristics of the present invention. They are provided to make those skilled in the art understand the present invention and implement it, and cannot thereby limit the extent of protection of the present invention. All equivalent changes or modifications according to the spirit of the present invention should fall within the extent of protection of the present invention.

What is claimed is:

1. A triaxial vibration composite testing apparatus, comprising a working tabletop, which is connected in a perpendicular Z axial direction with a Z axial vibration generator through a first axial vibration transmission mechanism, in a horizontal X axial direction with an X axial vibration generator through a second axial vibration transmission mechanism, and in a horizontal Y axial direction with a Y axial vibration generator through a third axial vibration transmission mechanism, wherein:

the second axial vibration transmission mechanism and the third axial vibration transmission mechanism are both a cross linear guide pair, which includes a slide block, a transverse guide and a longitudinal guide, the transverse guide and the longitudinal guide being crossingly positioned and space with each other, the slide block locate between the transverse guide and the longitudinal guide and slidingly connect to the transverse guide and the longitudinal guide at the same time; as for the transverse guide and the longitudinal guide, one of them is in fixed connection with the X or Y axial vibration generator, while the other with the working tabletop;

the first axial vibration transmission mechanism includes an upper clamp and a lower clamp and a central panel, the upper clamp and the lower clamp being horizontally opposite to each other up and down, the central panel being positioned between the upper clamp and the lower clamp, the upper clamp and the lower clamp oppositely clamping the central panel;

a first gap fit between upper surface of the central panel and lower surface of the upper clamp forms an upper fit plane, and a second gap fit between lower surface of the central panel and upper surface of the lower clamp forms a lower fit plane; an oil filling passage is positioned at the upper clamp, the lower clamp or the central panel for filling oil into the upper fit plane gap and the lower fit plane gap, and pumped high pressure oil forms a hydrostatic oil film in the upper fit plane gap and the lower fit plane gap, thus constituting a hydrostatic plane bearing mechanism; this hydrostatic plane bearing mechanism is connected with the Z axial vibration generator and the working tabletop as below:

the central panel is in fixed connection with the working tabletop, the upper clamp or the lower clamp is in fixed connection with the Z axial vibration generator via a connection member;

alternatively, the upper clamp or the lower clamp is in fixed connection with the working tabletop, the central panel is in fixed connection with the Z axial vibration generator via the connection member alternatively, upper surface of the upper clamp is used as the working tabletop, and the central panel is in fixed connection with the Z axial vibration generator via the connection member.

2. The triaxial vibration composite testing apparatus according to claim 1, wherein: the upper clamp and the lower clamp are provided with a tension screw, via which the upper clamp and the lower clamps are connected to constitute a gap-adjustable clamping structure.

3. The triaxial vibration composite testing apparatus according to claim 1, further comprising a Z axial guide support, which is fixed relative to table body of the Z axial vibration generator and provided in the Z axial direction with a guide hole, through which passes the central part of the connection member, wherein internal surface of the guide hole and external surface of the connection member constitute fit faces via gap fit, and the pumped high pressure oil forms a hydrostatic oil film between these fit faces, thus constituting a hydrostatic bearing guide structure.

4. The triaxial vibration composite testing apparatus according to claim 3, wherein: a circular dustproof film is connected between circumference of the working tabletop and that of the Z axial guide support.

\* \* \* \* \*